(12) United States Patent
Niemela et al.

(10) Patent No.: US 9,965,630 B2
(45) Date of Patent: May 8, 2018

(54) METHOD AND APPARATUS FOR ANTI-VIRUS SCANNING OF FILE SYSTEM

(75) Inventors: Jarno Niemela, Espoo (FI); Timo Harmonen, Numela (FI); Jorn Sierwald, Kiel (DE); Mika Stahlberg, Espoo (FI)

(73) Assignee: F-Secure Corporation, Helsinki (FI)

( * ) Notice: Subject to any disclaimer, the term of this patent is extended or adjusted under 35 U.S.C. 154(b) by 371 days.

(21) Appl. No.: 13/383,246

(22) PCT Filed: Jul. 7, 2010

(86) PCT No.: PCT/EP2010/059762
§ 371 (c)(1),
(2), (4) Date: Mar. 5, 2012

(87) PCT Pub. No.: WO2011/003958
PCT Pub. Date: Jan. 13, 2011

(65) Prior Publication Data
US 2012/0159631 A1    Jun. 21, 2012

(30) Foreign Application Priority Data
Jul. 10, 2009    (GB) .................................. 0912017.1

(51) Int. Cl.
*G06F 21/56*    (2013.01)
(52) U.S. Cl.
CPC .......... *G06F 21/564* (2013.01); *G06F 21/565* (2013.01)
(58) Field of Classification Search
None
See application file for complete search history.

(56) References Cited

U.S. PATENT DOCUMENTS

| | | | | |
|---|---|---|---|---|
| 5,649,095 A | * | 7/1997 | Cozza | 714/39 |
| 5,960,170 A | * | 9/1999 | Chen | G06F 21/564 |
| | | | | 714/26 |
| 6,952,776 B1 | | 10/2005 | Chess | 713/188 |
| 7,266,845 B2 | * | 9/2007 | Hypponen | 726/24 |
| 2001/0020272 A1 | | 9/2001 | Le Pennec et al. | 713/200 |
| 2003/0074574 A1 | | 4/2003 | Hursey et al. | 713/200 |
| 2004/0068664 A1 | * | 4/2004 | Nachenberg et al. | 713/200 |
| 2004/0158730 A1 | * | 8/2004 | Sarkar | 713/200 |
| 2005/0132184 A1 | * | 6/2005 | Palliyil et al. | 713/152 |

(Continued)

FOREIGN PATENT DOCUMENTS

| | | |
|---|---|---|
| JP | 2005522800 A | 7/2005 |
| JP | 2006040196 A | 2/2006 |

(Continued)

*Primary Examiner* — Henry Tsang
(74) *Attorney, Agent, or Firm* — Harrington & Smith (57) ABSTRACT

A method and apparatus for performing an anti-virus scan of a file system. Intermediate scanning results are obtained for a file in the file system, prior to a scan of the file being completed. The intermediate scanning results are then stored in a database. The intermediate scanning results can be used to speed up subsequent scans, and to provide other useful information to an on-line anti-virus server. In a subsequent scan of the file system, a determination is made whether intermediate scanning results relating to the file are available in the database. If they are available for a particular type of intermediate scan, then a scan need not be performed for the file. If they are not, then the scan can be performed.

10 Claims, 3 Drawing Sheets

(56) References Cited

U.S. PATENT DOCUMENTS

| | | | |
|---|---|---|---|
| 2006/0021032 A1* | 1/2006 | Challener et al. | 726/22 |
| 2006/0174344 A1* | 8/2006 | Costea | G06F 21/564 |
| | | | 726/24 |
| 2007/0180530 A1 | 8/2007 | Verma et al. | 726/24 |
| 2008/0141373 A1 | 6/2008 | Fossen et al. | 726/23 |
| 2009/0070879 A1 | 3/2009 | Saika | 726/24 |
| 2009/0094698 A1 | 4/2009 | Nichols et al. | 726/24 |
| 2009/0119681 A1* | 5/2009 | Bhogal et al. | 719/318 |

FOREIGN PATENT DOCUMENTS

| | | |
|---|---|---|
| JP | 2007200102 A | 8/2007 |
| JP | 2008276774 A | 11/2008 |
| WO | WO 99/27450 | 6/1999 |

\* cited by examiner

METHOD AND APPARATUS FOR ANTI-VIRUS SCANNING OF FILE SYSTEM

FIELD OF THE INVENTION

The present invention relates to the field of anti-virus scanning of files stored in a file system.

BACKGROUND TO THE INVENTION

Malware is short for malicious software and is used as a term to refer to any software designed to infiltrate or damage a computer system without the owner's informed consent. Malware can include viruses, worms, trojan horses, rootkits, adware, spyware and any other malicious and unwanted software. Any client device, such as a desktop personal computer (PC), laptop, personal data assistant (PDA) or mobile phone, can be at risk from malware.

When a device is infected by malware the user will often notice unwanted behaviour and degradation of system performance as the infection can create unwanted processor activity, memory usage, and network traffic. This can also cause stability issues leading to application or system-wide crashes. The user of an infected device may incorrectly assume that poor performance is a result of software flaws or hardware problems, taking inappropriate remedial action, when the actual cause is a malware infection of which they are unaware.

Detecting malware is challenging as the malware authors design their software to be difficult to detect, often employing technology that deliberately hides the presence of malware on a system, i.e. the malware application may not show up on the operating system tables that list currently running processes.

Client devices make use of anti-virus applications to detect and possibly remove malware. An anti-virus application can make use of various methods to detect malware including scanning, integrity checking and heuristic analysis. Of these methods, malware scanning involves the anti-virus application examining objects such as files for a virus fingerprint or "signature" that is characteristic of an individual malware program.

When an object is scanned, several operations are performed in sequence. Initial operations are simple and quick checks that can be used to rule out the possibility of the object being malware. Examples of operations performed early in the sequence include comparing checksums, file header information, number of file sections and other file properties that typically differ between clean and infected objects. By performing these operations in sequence, the scan becomes quicker, as an object can be discounted before more detailed scanning of the object is required.

Many anti-virus applications store a result of a scan in a cache to ensure that a clean file is only scanned once. However, each time a database of signatures is updated, the cache must be flushed as there is no way of knowing which cached scan results are no longer valid in the light of the new signatures. This means that all files must be rescanned after each database update, which is time consuming and uses processor resources.

SUMMARY OF THE INVENTION

It is an object of the invention to improve the speed of scanning a file stored in a file system, and a further object to provide more useful information to an online anti-virus server, allowing a client to know when to re-scan a previously scanned file in the light of the release of a new malware.

According to a first aspect of the invention, there is provided a method of performing an anti-virus scan of a file system. Intermediate scanning results are obtained for a file in the file system, prior to a scan of the file being completed. The intermediate scanning results are then stored in a database. The intermediate scanning results can be used to speed up subsequent scans, and to provide other useful information to an on-line anti-virus server. During a subsequent anti-virus scan of the file system, and prior to performing an intermediate scan of the file stored in the file system, a determination is made whether intermediate scanning results relating to the file are available in the database. If they are available for a particular type of intermediate scan, then that scan need not be performed for the file. If they are not, then the scan can be performed. As an option, the results of new intermediate scans can be added to the database.

Intermediate scanning results are optionally selected from scanning for any of a checksum, file header information, number of file sections, hash values for the file, hash values for parts of the file, key data from emulation, cyclic redundancy check values, and byte search results.

As an option, in the event that a new malware signature is available, the method comprises determining from the results stored in the database those files that cannot match the pre-filter information associated with a signature of the new malware, and excluding those files from a subsequent scan of the file system. Pre-filter information is optionally selected from any of date of last scanning, file type, file size, number of file sections, file header information, hash values for the file, hash values for parts of the file, cyclic redundancy check values and byte search results.

According to a further option, the method comprises storing in the database a date at which a file was last modified, estimating when infection by a malware was first possible and, in a subsequent scan of the file system, omitting from the scan those files that were last modified before infection by a malware was first possible. As a further option, the method comprises storing in the database a date when a file was last scanned, comparing the date when the file was last scanned with a date when an anti-virus database was updated with a new malware definition and, in a subsequent scan of the file system, omitting from the scan those files that were last scanned after the anti-virus database was updated with the new malware definition.

According to an optional embodiment, the database is located remotely from the file system. This is particularly useful for on-line anti-virus scanning. In this case, the method optionally comprises, at a remote anti-virus server, and prior to sending a malware signature to a client device for scanning files in a file system, using the intermediate scanning results stored in the database to determine a set of malware signatures relevant to the files in the file system. The set of malware signatures can then be sent to the client device. In this way, only necessary signatures for the client are sent, thereby reducing signalling required.

The method optionally further comprises storing at the intermediate scanning results database intermediate scanning results for any of a plurality of file systems stored at a plurality of client devices. For each client device, further data is stored, the further data comprising any of geographical location of the client device and time that a file was stored in a file system at the client device. At a remote anti-virus server, the further data is sued to determine a set of client devices from which to request a sample of all or part of a file, and a request is sent for a sample of all or part of a file to each client device of the set of client devices.

According to a second aspect of the invention, there is provided a computer device that has a memory for storing a file system, an anti-virus function for performing an anti-virus scan of at least one file stored in the file system, wherein the anti-virus function is arranged to perform at least one intermediate scan of the file, and means for storing the results of the at least one intermediate scan in an intermediate scanning results database. The anti-virus function is further arranged to perform a subsequent scan of the file in the file system and, prior to performing an intermediate scan of the file, determine if intermediate scanning results relating to the file are available in the database. Where an intermediate scanning result is available in the database for the intermediate scan, the intermediate scan is not performed on the file, and where the intermediate scanning result is not available in the database for the intermediate scan, that intermediate scan is performed on the file.

The computer device optionally comprises the intermediate scanning results database, although this may be located remotely in other embodiments, in which case the computer device comprises a transmitter for sending the results of the intermediate scan to a remote node for populating in the intermediate scanning results database.

According to a third aspect of the invention, there is provided an anti-virus server for use in a communication network. The anti-virus server comprises means for communicating with a client device having a file system in which a plurality of files are stored, and a processor arranged to perform an anti-virus scan of at least one file in the file system, wherein the anti-virus scan comprises at least one intermediate scan of the file. There is also provided for storing the results of the intermediate scan in an intermediate scan results database.

The processor is optionally further arranged to use the intermediate scanning results stored in the database to determine a set of malware signatures relevant to the files in the file system at the client device and the means for communicating with the client device are arranged to send the set of malware signatures to the client device. As a further option, the processor is further arranged to use data stored at the intermediate scanning results database to determine a set of client devices from which to request a sample of all or part of a file, and the means for communicating with the client device are arranged to send sending a request for a sample of all or part of a file from the client device.

According to a fourth aspect of the invention, there is provided a computer program, comprising computer readable code which, when run on a programmable computer, causes the programmable computer to perform an anti-virus scan of a file system. The computer program comprises instructions for obtaining, for a file stored in the file system, intermediate scanning results prior to a scan of the file being completed, and storing the intermediate scanning results in a database. The computer program comprises instructions for, during a subsequent anti-virus scan of the file system, and prior to performing an intermediate scan of the file stored in the file system, determining if intermediate scanning results relating to the file are available in the database. Where intermediate scanning results are available in the database for a particular type of intermediate scan, that intermediate scan is not performed on the file. Where intermediate scanning results are not available in the database for a particular type of intermediate scan, then the intermediate scan is performed on the file.

The computer program optionally comprises instructions for, in the event that a new malware signature is available, determining from the results stored in the database those files that cannot match the pre-filter information associated with a signature of the new malware, and excluding those files from a subsequent scan of the file system.

As an option, the computer program comprises instructions for storing in the database a date at which a file was last modified, estimating when infection by a malware was first possible, and, in a subsequent scan of the file system, omitting from the scan those files that were last modified before infection by a malware was first possible. This ensures that files that cannot be infected are not scanned.

As a further option, the computer program comprises instructions for storing in the database a date when a file was last scanned, comparing the date when the file was last scanned with a date when an anti-virus database was updated with a new malware definition, and in a subsequent scan of the file system, omitting from the scan those files that were last scanned after the anti-virus database was updated with the new malware definition.

Where the database if located remotely, the computer program comprises instructions for communicating with the remote database. As an option, the computer program comprises instructions for receiving from a remote anti-virus server, a set of malware signatures, the set of malware signatures having been determined at the remote anti-virus server using the intermediate scanning results stored in the database to determine a set of malware signatures relevant to the files in the file system, ensuring that only relevant signatures are sent to the computer device.

According to a fifth aspect of the invention, there is provided a computer program, comprising computer readable code which, when run on a programmable computer, causes the programmable computer to perform a method as described above in the first aspect of the invention.

According to a sixth aspect of the invention, there is provided a computer program, comprising computer readable code which, when run on a computer device, causes the computer device to behave as a computer device as described above in the second aspect of the invention.

According to a seventh aspect of the invention, there is provided a computer program, comprising computer readable code which, when run on a server, causes the server to behave as an anti-virus server as described above in the third aspect of the invention.

According to an eighth aspect of the invention, there is provided a recording medium storing computer readable code as described above for any one of the fourth, fifth, sixth or seventh aspects of the invention.

DETAILED DESCRIPTION OF CERTAIN EMBODIMENTS

Figure 1:
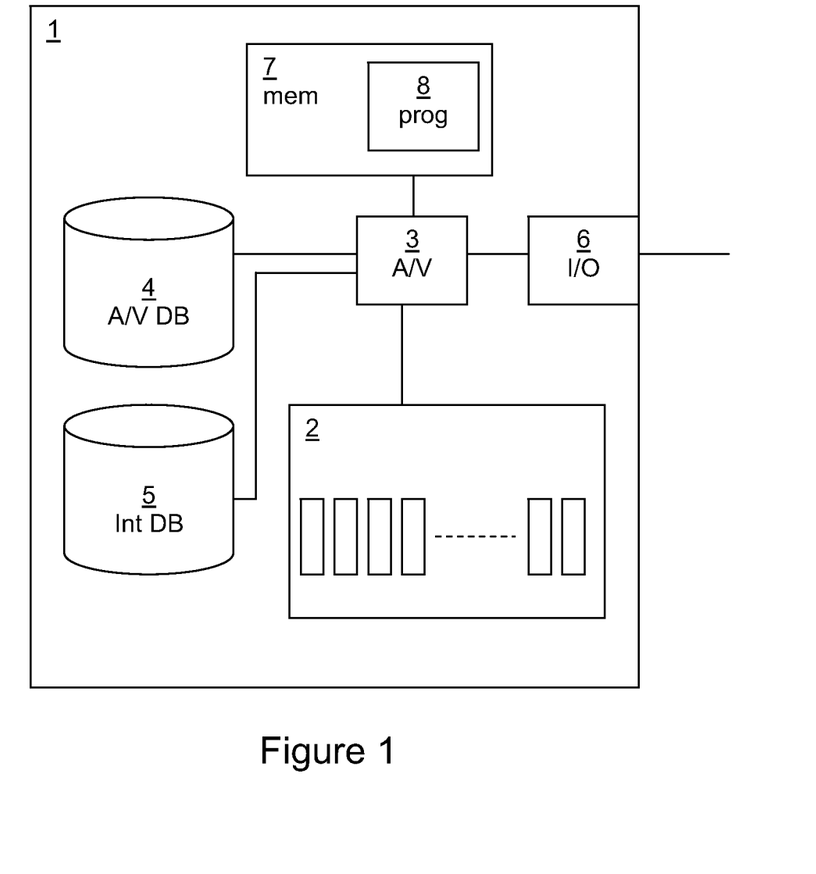
FIG. 1 illustrates schematically in a block diagram a client device according to an embodiment of the invention.

Referring to FIG. 1, a client device 1 according to a first embodiment of the invention is illustrated. The client device 1 has access to a file system 2 at which a plurality of files to be scanned is stored. An anti-virus function 3 is provided, which can interact with the file system 2 in order to perform a scan of files stored at the file system 2, and also with an anti-virus database 4 which contains signature information about malware.

When the anti-virus function 3 scans a file in the file system 2, it performs several intermediate scans, each of which looks at one aspect of a file. Signature information for each virus contains "pre-filter" information that can be used to quickly rule out a file before resource-intensive scanning and detailed disinfection routines are required to determine whether a file is malicious. An intermediate scan is used to calculate or otherwise obtain intermediate data from the file for comparison with pre-filter information stored at the anti-virus database 4. A complete scan is available once sufficient intermediate scans have been performed. An intermediate scan may be used to obtain information that may include the results of an online check, related timestamps, and intermediate scanning results such as the results of a checksum comparison, file header information, number of sections and so on. Other examples of intermediate scanning results include the results of performing hash operations on both full and partial files, key data from emulation, cyclic redundancy check (crc) values, byte search results, and results of static analysis.

An intermediate scanning results database 5 is provided, which is used to store the intermediate scanning results for each file. By storing this information in a database, intermediate scanning results that are needed frequently, or early in the scanning process, or are expensive to calculate (in terms of consuming processing or disk I/O resources) can be reused. The intermediate scanning results database 5 is structured in any suitable way to allow quick access to the data. For example, the intermediate scanning results database 5 may be indexed using a file path and by all the calculated data, making queries very fast.

In order to keep the intermediate scanning results database 5 up to date, if a file in the file system 2 is changed then the data stored in the intermediate scanning results database 5 relating to that file is either removed or flagged as no longer valid.

When the anti-virus function 3 next performs a scan of the files in the file system 2, it can use information stored in the intermediate scanning results database 5 to speed up the scanning process by comparing the information stored in the intermediate scanning results database 5 with pre-filter information stored in the anti-virus database 4. This prevents resource intensive scanning of each file to obtain the intermediate data. In the event that it is found that a file in the file system 2 must be scanned, then the intermediate scanning results database 5 is checked to determine which intermediate scanning results are available. Instead of calculating the intermediate scanning results again, scanning operations can use the intermediate scanning results stored in the database 5 where available.

Information stored in the intermediate scanning results database 5 can also be used to prevent unnecessary operations and speed up the scanning process after an update of the anti-virus database 4 update. When the anti-virus database 4 receives new virus data via an I/O device 6, prior art systems without an intermediate scanning results database 5 must rescan the files stored in the file system 2. However, according to this embodiment of the invention, the anti-virus function 3 compares information in the intermediate scanning results database 5 with pre-filter information for each updated or new malware signature included in the new virus data, thereby eliminating a large number of files that would otherwise be scanned. Furthermore, the anti-virus function 3 checks the intermediate scanning results database 5 to rule out any signatures that cannot match against any file in the system (for example, detection of malware known to be associated with a particular file, when it is already known that that file is not stored in the file system 2), and to rule out files that cannot match remaining signatures. This creates a reduced set of files that must be scanned, thereby speeding up the scanning process. This greatly speeds up the scanning process after an anti-virus database 4 update.

This operation may be carried out only for new or modified signatures, in which case those signatures must contain timestamp or other counter information. The intermediate scanning results database 5 includes information identifying when a file was last scanned, such as a time stamp or counter of a signature database that was previously used to scan the file, and so re-scanning needs to be done only with signatures added or modified since the previous scan.

The signatures stored in the anti-virus database 4 may include information that identifies when particular malware was estimated to have been released 'into the wild'. This date would typically be determined by the operator of the anti-virus database, and would be based on, for example, the date at which the operator first became aware of the malware. In this case, files in the file system 2 that have not been modified since the date when the malware first appeared need not be scanned, thereby reducing the scanning time.

The intermediate scanning results database 5 minimizes the impact of an anti-virus database 4 update, and so it is feasible for suppliers of anti-virus database 4 updates to provide smaller, more frequent updates, allowing them to react more quickly to new threats. The use of the intermediate scanning results database 5 also improves the speed of access of files. Using prior art methods, most anti-virus applications will only check a file when it is next accessed after an update to the anti-virus database 4. Using the intermediate scanning results database 5, a full system scan can effectively be performed each time a new virus signature update is received at the device 1.

The use of the intermediate scanning results database 5 also improves scanning times for on-demand scanning (scanning when a user instructs a scan, rather than at a set time or after a particular event such as an anti-virus database 4 update). Normally, an on-demand scan scans all files in the file system 2, making the scanning process a time consuming and resource-intensive process. The anti-virus function 3 checks the intermediate scanning results database 5 to rule out any detections that cannot match against any file in the system (for example, detection of malware known to be associated with a particular file, when it is already known that that file is not stored in the file system 2), and to rule out files that cannot match remaining detections. This creates a reduced set of files that must be scanned with a minimum set of detections, thereby speeding up the scanning process.

The client device 1 may also be provided with a computer readable medium in the form of a memory 7 on which a computer program 8 in the form of computer readable code is stored. When executed by a processor at the client device 1, the client device 1 performs an anti-virus scan.

Figure 2:
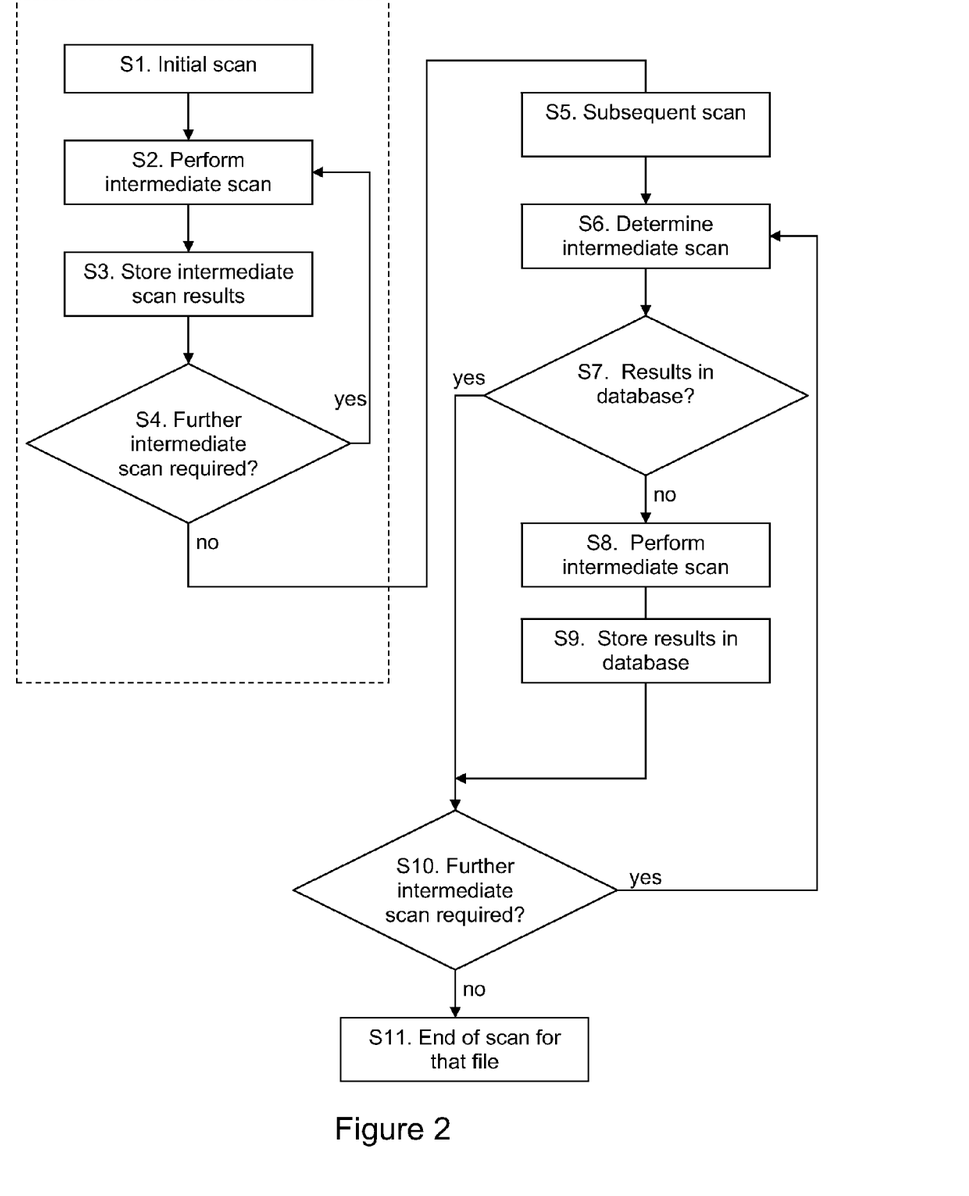
FIG. 2 is a flow diagram showing the steps of an embodiment of the invention.

FIG. 2 is a flow diagram illustrating the steps according to the first embodiment of the invention. Note that the flow diagram illustrates the procedure for one file in the file system. It will be appreciated that the procedure would most likely be repeated for many files stored in the files system. The following numbering corresponds to the numbering of FIG. 2.

S1. An initial scan is performed to populate the intermediate scanning results database 5. The dotted line around steps S1 to S4 denotes the steps taken in the initial scan.

S2. An intermediate scan is performed on a file in the file system. This may be any intermediate scan, such as a checksum comparison, crc results and so on, as described above.

S3. The results of the intermediate scan are stored in the intermediate scanning results database 5.

S4. If a further intermediate scan is required, then the process reverts to step S2. If not, then the intermediate scans for the file are all complete.

S5. A subsequent scan of the file system is initiated.

S6. For a given file stored in the file system, the anti-virus function 3 determines an intermediate scan to be carried out.

S7. The anti-virus function 3 determines whether the results of the intermediate scan are already stored in the intermediate scan database 5. If so, then the results stored in the database are used by the anti-virus function, and the process continues at step S10, otherwise the procedure continues at step S8.

S8. As no results of the intermediate scan are available for that file, an intermediate scan is performed on the file.

S9. In an optional embodiment, the results of the intermediate scan are stored in the intermediate scan database 5 for use in subsequent scans of the file system.

S10. If a further intermediate scan is required to obtain different information relating to the file, then the procedure reverts to step S6.

S11. The scan is now complete for that file. Note in almost every case, the procedure of a subsequent scan for steps S5 to S11 will be repeated for a plurality of files stored in the file system.

In a second specific embodiment of the invention, an intermediate scanning results database specific to a client is located remotely from a client device. This is to address a problem that arises in online anti-virus scanning. Online anti-virus scanning is based on running an anti-virus scan at least in part remotely. The client device contacts an anti-virus server to perform the on-line anti-virus scan if files stored in the file system of the client device.

Figure 3:
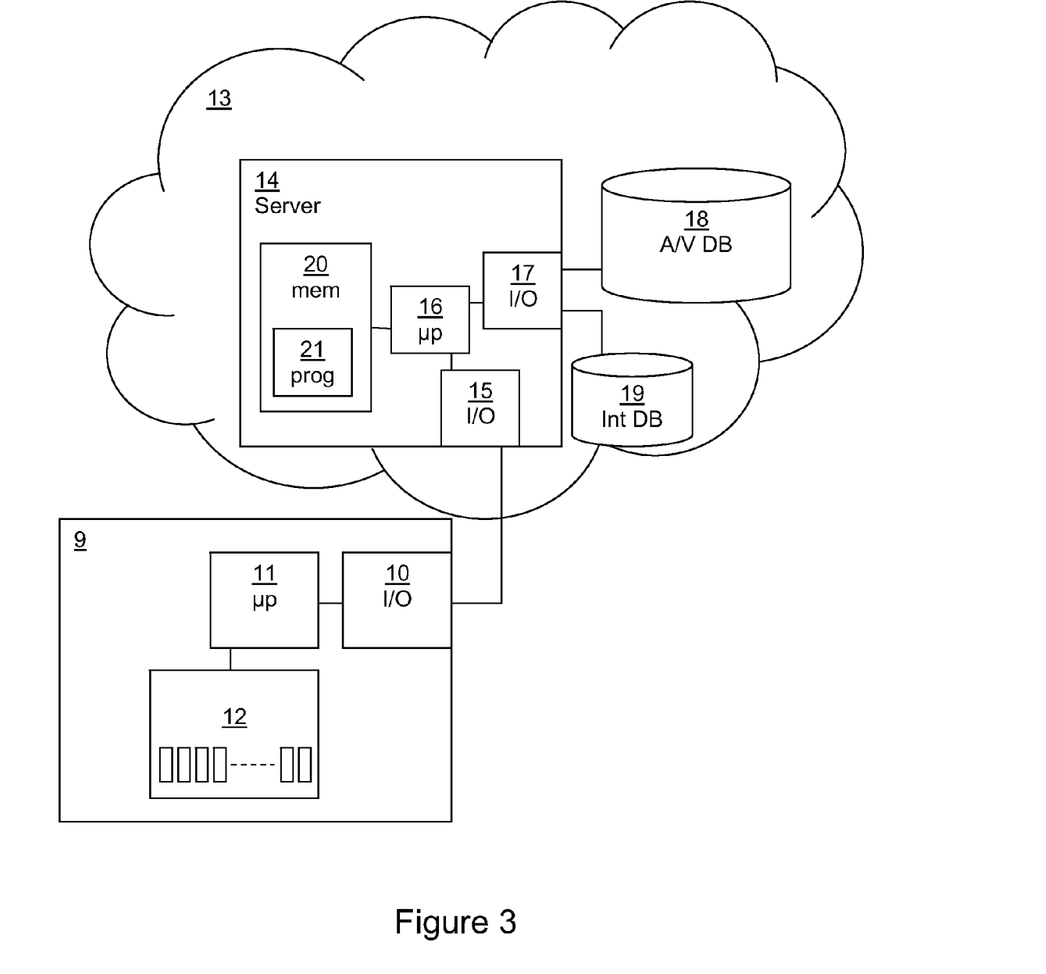
FIG. 3 illustrates schematically in a block diagram a network architecture according to an embodiment of the invention.

Referring to FIG. 3 herein, a client device 9 is provided that has an I/O device 10, a processor 11 and a file system 12 communicates over a communication network 13 with a remote server 14. The remote server 14 has an I/O device 15 for communication with the client device 9, a processor 16, and an I/O device 17 for communicating with a remote anti-virus database 18. Note that the database may be located at the server 14. Files stored in the file system 12 are scanned remotely by checking against the remote anti-virus database 18. This eliminates the need to distribute a large anti-virus signature databases to every client, and allows updates to be entered into the remote anti-virus 18 database quickly, allowing a very quick response to new threats.

As described above, the speed of a scan can be greatly improved by omitting from a scan known clean files stored in the file system 12. Only unclassified files must be scanned. One way to identify known clean files is by using a file hash value to prevent false positive results.

A problem with on-line virus scanning is that of having an effective signature publishing mechanism. When the anti-virus database 18 is updated with signatures for new or modified malware, the client device 9 will only detect this change when they next query the remote anti-virus server 14 for unclassified files stored in the file system 12. One way to address this problem is to have each client 9 poll the remote server 14 at frequent intervals for details of new signatures, but this is both signalling intensive (a server may handle many thousands of clients) and resource intensive for the server 14. Conversely, if the client device 9 contacts the remote server 14 infrequently, then it could be infected with malware for some time before an online anti-virus scan detects this. Another option is to give each signature a time-to-live (TTL) value. A TTL value determines the period for which a signature can be validly used. However, this option would also increase network traffic and the server load. A further problem is that of obtaining samples of suspicious files for further analysis from clients, as when they are scanned for the first time there are no rules or signatures (for a subsequent malware) that would trigger them as malicious, and so they would not be passed to the server 14 for further analysis.

The second embodiment of the invention addresses the problems mentioned above by providing an intermediate scanning database 19 containing intermediate scanning results specific to each client, and the intermediate scanning results database 19 is accessible by the server 14. The client device 9 sends metadata relating to unclassified files to the server 14. The metadata may include local scanning result with related timestamps, and various intermediate scanning results as described for the first embodiment. This includes simple checksums, file header information, number of sections and other file properties that are commonly different between clean and infected files. The intermediate scanning results may include at least several hash operations, both full file and partial file hashes, key data from emulation, intermediate scan results (crc values, byte search results, etc) and results of a static analysis.

The intermediate scanning results database 19 is used to store the intermediate scanning results produced on the client device 9 for each specific file, and also a list of other client devices that have that file stored in a file system. There are several ways in which the intermediate scanning database 19 can be used, as described below.

The intermediate scanning results database 19 can be used to ensure that each client is only provided with anti-virus signatures that match to unclassified files stored at the client device file system. The Server 14 uses data obtained from the intermediate scanning database 19 to determine which files should be scanned using a particular detection signature, and on which client device. Only those signatures that may be relevant to the client device 9 are sent to that client, so that each client will be sent only signatures that are, or are likely to be, relevant to that client. This reduces the usage of client resources, and reduces the usage of bandwidth in distributing the signatures.

When new malware is identified, signature data for that malware can be either actively pushed to the client device 9 when it is available, or sent to the client device 9 when the client device 9 next connects to the server 14. The client device 9 uses the information to launch a scan and possibly disinfect malware. This greatly speeds up the distribution of signature information to clients.

The intermediate scanning results database 19 can also be used to determine how many clients served by the server 14 have a copy of a particular file, the geographic location of these clients, the time that the file was stored in the file system and so on. This information can be used to trigger sample requests from client, such that the sample requests are only sent to those clients that have the suspicious file.

A further use of the intermediate scanning database 19 is to optimize signature creation. There is no reason to create signatures that do not contain any detection that could match on any file that clients have, as this would be a waste of processing resources and bandwidth.

By using the intermediate scanning results database 19, a list of files that can cause false positives over the whole customer base for a given signature can be fully identified. False positive testing can be optimized and only run only for this limited set of files.

The server 14 may also be provided with a computer readable medium in the form of a memory 20 on which a computer program 21 in the form of computer readable code is stored. When executed by a processor at the server 14, the server 14 performs an anti-virus scan.

It will be appreciated by the person of skill in the art that various modifications may be made to the above described embodiment without departing from the scope of the present invention. For example, the examples given above show the client device having only one file system. It will be appreciated that the file system may be stored on a hard drive, an optical drive, a Random Access Memory, or any other type of memory, and that more than one file system may be provided.

The invention claimed is:

1. A method of performing an anti-virus scan of a file system on a client device, the method comprising:
at the client device
for files stored in the file system, commencing an initial anti-virus scan including performing an intermediate scan to obtain intermediate scanning results prior to the initial anti-virus scan of the files being completed, the intermediate scanning results including at least a file type of each file;
storing the intermediate scanning results in a database; and
completing the initial anti-virus scan;
during a subsequent anti-virus scan of the file system, prior to performing a second intermediate scan of each file stored in the file system, determining if intermediate scanning results relating to the file are available in the database, and,
where intermediate scanning results are available in the database for a particular type of intermediate scan, not performing that type of intermediate scan of the file, and where intermediate scanning results are not available in the database for a particular type of intermediate scan, performing that type of intermediate scan of the file to obtain intermediate scanning results, and in both cases completing the subsequent anti-virus scan using the stored intermediate scanning results,
at a remote anti-virus server;
prior to sending a malware signature update to the client device for scanning files in the file system, using the intermediate scanning results stored in the database to determine a set of malware signatures relevant to the files in the file system; and
sending only the set of malware signatures to the client device together with pre-filter information including at least an identification of a file type(s) to which the set of malware signatures is relevant,
at the client device;
when performing the subsequent anti-virus scan of the file system for a given malware signature, for a given file of the file system comparing intermediate scanning results for the given file with pre-filter information for the given malware signature to determine if the given malware signature is relevant to the file type of the given file and scanning the given file only if this is true;
storing in the database a date at which a file of the file system was last modified;
estimating when infection by a recent malware was first possible; and
in a subsequent anti-virus scan of the file system for a signature of the recent malware, omitting those files that were last modified before infection by the recent malware was first possible;
wherein the particular type of intermediate scan comprises at least one of a checksum scan, a scan for file header information, a scan for a number of file sections, a scan for hash values for the file, a scan for hash values for parts of the file, a scan for key data from emulation, a scan for cyclic redundancy check values, and a byte search results scan.

2. The method according to claim 1, further comprising, in an event that a new malware signature is available, determining from the intermediate scanning results stored in the database those files in the file system that cannot match pre-filter information associated with the new malware signature, and excluding those files from a subsequent anti-virus scan of the file system for that new malware signature.

3. The method according to claim 1, further comprising:
storing in the database a date when a file of the file system was last scanned;
comparing the date when the file was last scanned with a date when an antivirus database was updated with a new malware definition; and
in the subsequent anti-virus scan of the file system, omitting from the subsequent scan those files that that were last scanned after the anti-virus database was updated with the new malware definition.

4. The method according to claim 1, the method further comprising:
storing at the database intermediate scanning results for any of a plurality of file systems stored at a plurality of client devices;
for each client device, storing further data, the further data comprising any of geographical location of each of the plurality of client devices and times that a file was stored in a file system at each of the plurality of client devices;
at the remote anti-virus server, using the further data to determine a set of client devices from which to request a sample of all or part of a file; and
sending a request for the sample of all or part of the file to each of the client devices of the set of client devices.

5. A computer device comprising:
a memory for storing a file system;
an anti-virus program for performing an initial anti-virus scan of files stored in the file system, wherein the anti-virus program is arranged to perform at least one intermediate scan of the files as part of the initial anti-virus scan, and to complete the initial anti-virus scan, results from the intermediate scan including at least a file type of each file;
means for storing the results of the at least one intermediate scan of the files in an intermediate scanning results database; and further comprising
a transmitter for sending the results of the intermediate scan of the files to a remote node for populating in the intermediate scanning results database;
means for determining, during a subsequent anti-virus scan of the file system, prior to performing a second intermediate scan of each file stored in the file system, if intermediate scanning results relating to the file are available in the intermediate scanning results database, and;
where intermediate scanning results are available in the intermediate scanning results database for a particular type of intermediate scan, not performing that type of intermediate scan of the file, and where intermediate scanning results are not available in the intermediate scanning results database for a particular type of intermediate scan, means for performing that type, of intermediate scan of the file to obtain intermediate scanning results, and in both cases completing the subsequent anti-virus scan using the stored intermediate scanning results;
means for receiving from a remote anti-virus server, a set of malware signature updates, the set of malware signature updates having been determined at the remote anti-virus server by using the intermediate scanning results stored in the database and by using pre-filter information, received with the set of malware signature updates from the remote anti-virus server, and including at least an identification of a file type(s) to which the set of malware signatures is relevant;
means for performing the subsequent anti-virus scan of the file system for a given malware signature, for a given file of the file system comparing intermediate scanning results for the given file with pre-filter information for the given malware signature to determine if the given malware signature is relevant to the file type of the given file and scanning the given file only if this is true;
means for storing in the database a date at which a file of the file system was last modified;
means for estimating when infection by a recent malware was first possible; and
in a subsequent scan of the file system for a signature of the recent malware, means for omitting those files that were last modified before infection by the recent malware was first possible;
wherein the particular type of intermediate scan comprises at least one of a checksum scan, a scan for file header information, a scan for a number of file sections, a scan for hash values for the file, a scan for hash values for parts of the file, a scan for key data from emulation, a scan for cyclic redundancy check values, and a byte search results scan.

6. An anti-virus server for use in a communication network, the anti-virus server comprising:
means for communicating with a client device having a file system in which a plurality of files are stored;
a processor arranged to perform an initial anti-virus scan of each file in the file system, wherein the initial anti-virus scan comprises at least one intermediate scan of each file to determine intermediate scanning results prior to the initial anti-virus scan being completed, the intermediate scanning results including at least a file type of each file;
means for storing the results of the intermediate scan in an intermediate scan results database; and
means for determining, during a subsequent anti-virus scan of the file system, prior to performing a second intermediate scan of each file stored in the file system, if intermediate scanning results relating to the file are available in the intermediate scan results database;
where intermediate scanning results are available in the intermediate scan results database for a particular type of intermediate scan, not performing that type of intermediate scan of the file, and where intermediate scanning results are not available in the intermediate scan results database for a particular type of intermediate scan, means for performing that type of intermediate scan of the file to obtain intermediate scanning results, and in both cases completing the subsequent anti-virus scan using the stored intermediate scanning results; and
where the means for communicating with the client device are arranged to send only the set of malware signatures relevant to those files that match pre-filter information associated with a signature of the malware to the client device;
the anti-virus server further comprising means for, when performing the subsequent anti-virus scan of the file system for a given malware signature, for a given file of the file system comparing intermediate scanning results for the given file with pre-filter information for the given malware signature to determine if the given malware signature is relevant to the file type of the given file and scanning the given file only if this is true;
means for storing in the database a date at which a file of the file system was last modified;
means for estimating when infection by a recent malware was first possible; and
in a subsequent scan of the file system for a signature of the recent malware, means for omitting those files that were last modified before infection by the recent malware was first possible;
wherein the particular type of intermediate scan comprises at least one of a checksum scan, a scan for file header information, a scan for a number of file sections, a scan for hash values for the file, a scan for hash values for parts of the file, a scan for key data from emulation, a scan for cyclic redundancy check values, and a byte search results scan.

7. The anti-virus server according to claim 6, wherein the processor is further arranged to use data stored at the intermediate scanning results database to determine a set of client devices from which to request a sample of all or part of a file; and
the means for communicating with the client device are arranged to send a request for the sample of all or part of the file from the client device.

8. A non-transitory recording medium storing a computer program, comprising computer readable code which, when run on a programmable computer, causes the programmable computer to perform an anti-virus scan of a file system, the computer program comprising instructions for:
commencing an initial anti-virus scan including performing an intermediate scan to obtain, for files stored in the file system, intermediate scanning results prior to the initial anti-virus scan of the files being completed, the intermediate scanning results including at least a file type of each file; and
storing the intermediate scanning results in a database; and
during a subsequent anti-virus scan of the file system, prior to performing a second intermediate scan of each file stored in the file system, determining if intermediate scanning results relating to the file are available in the database; and
where intermediate scanning results are available in the database for a particular type of intermediate scan, not performing that type of intermediate scan of the file, and where intermediate scanning results are not available in the database for a particular type of intermediate scan, performing that type of intermediate scan of the file to obtain intermediate scanning results, and in both cases completing the subsequent anti-virus scan using the stored intermediate scanning results;

the computer program further comprising instructions for receiving from a remote anti-virus server, prior to sending a malware signature update to a client device for scanning files in the file system, using the intermediate scanning results stored in the database to determine a set of malware signatures, the set of malware signatures having been determined at the remote anti-virus server and sending only the set of malware signatures to the client device together with pre-filter information including at least an identification of a file type(s) to which the set of malware signatures is relevant;

the computer program further comprising instructions for performing at the client device, a subsequent anti-virus scan of the file system for a given malware signature, for a given file of the file system comparing intermediate scanning results for the given file with pre-filter information for the given malware signature to determine if the given malware signature is relevant to the file type of the given file and scanning the given file only if this is true; and the computer program comprising instructions for storing in the database a date at which a file of the file system was last modified, estimating when infection by a recent malware was first possible, and, in a subsequent anti-virus scan of the file system for a signature of the recent malware, omitting those files that were last modified before infection by the recent malware was first possible;

wherein the particular type of intermediate scan comprises at least one of a checksum scan, a scan for file header information, a scan for a number of file sections, a scan for hash values for the file, a scan for hash values for parts of the file, a scan for key data from emulation, a scan for cyclic redundancy check values, and a byte search results scan.

9. The non-transitory recording medium storing the computer program for causing the programmable computer to perform an anti-virus scan of a file system according to claim 8, the computer program comprising instructions for, in an event that a new malware signature is available, determining from the intermediate scanning results stored in the database those files in the file system that cannot match the pre-filter information associated with the new malware signature, and excluding those files from a subsequent anti-virus scan of the file system for that new malware signature.

10. The non-transitory recording medium storing the computer program for causing the programmable computer to perform an anti-virus scan of a file system according to claim 8, the computer program comprising instructions for storing in the database a date when a file in the file system was last scanned, comparing the date when the file was last scanned with a date when an anti-virus database was updated with a new malware definition, and in the subsequent anti-virus scan of the file system, omitting from the subsequent scan those files that that were last scanned after the anti-virus database was updated with the new malware definition.

* * * * *